(12) United States Patent
Schwiegk et al.

US008999211B2

(10) Patent No.: US 8,999,211 B2
(45) Date of Patent: Apr. 7, 2015

(54) METHOD FOR PRODUCING POROUS STRUCTURES FROM SYNTHETIC POLYMERS

(75) Inventors: Stefan Schwiegk, Neustaft (DE); Axel Wilms, Weisenheim (DE); Ronald Frans Maria Lange, Gümlingen (CH); Michael Siemer, Mannheim (DE); Giovanni D'Andola, Heidelberg (DE); Volker Rauschenberger, Eisenberg (DE); Frank Hermanutz, Leonberg (DE); Frank Gaehr, Esslingen (DE); Julien Courtois, Ludwigshafen (DE); Dirk Gerhard, Mannheim (DE)

(73) Assignee: BASF SE (DE)

(*) Notice: Subject to any disclaimer, the term of this patent is extended or adjusted under 35 U.S.C. 154(b) by 541 days.

(21) Appl. No.: 12/867,040

(22) PCT Filed: Feb. 11, 2009

(86) PCT No.: PCT/EP2009/051576
§ 371 (c)(1),
(2), (4) Date: Aug. 10, 2010

(87) PCT Pub. No.: WO2009/101111
PCT Pub. Date: Aug. 20, 2009

(65) Prior Publication Data
US 2010/0310853 A1    Dec. 9, 2010

(30) Foreign Application Priority Data
Feb. 11, 2008   (EP) ..................................... 08151251

(51) Int. Cl.
*D01D 5/06* (2006.01)
*D01D 5/247* (2006.01)
*C08J 9/28* (2006.01)
*B29C 67/20* (2006.01)

(52) U.S. Cl.
CPC ................. *C08J 9/28* (2013.01); *B29C 67/202* (2013.01); *C08J 2201/0542* (2013.01); *C08J 2377/00* (2013.01)

(58) Field of Classification Search
USPC ..................... 264/28, 41, 184, 211.16, 211.19
See application file for complete search history.

(56) References Cited

U.S. PATENT DOCUMENTS

| 2,071,250 | A |   | 2/1937  | Carothers |
|-----------|---|---|---------|-----------|
| 2,071,251 | A |   | 2/1937  | Carothers |
| 2,130,523 | A |   | 9/1938  | Carothers |
| 2,130,948 | A |   | 9/1938  | Carothers |
| 2,241,322 | A |   | 5/1941  | Hanford |
| 2,312,966 | A |   | 3/1943  | Hanford |
| 2,512,606 | A |   | 6/1950  | Bolton et al. |
| 3,393,210 | A |   | 7/1968  | Speck |
| 3,428,584 | A | * | 2/1969  | Riley ........................... 264/28 X |
| 4,118,449 | A |   | 10/1978 | Rinde |
| 4,200,707 | A | * | 4/1980  | Richardson ................... 524/132 |
| 4,537,949 | A |   | 8/1985  | Schmidt et al. |
| 4,540,772 | A |   | 9/1985  | Pipper et al. |
| 5,130,065 | A |   | 7/1992  | Klee et al. |
| 5,300,272 | A |   | 4/1994  | Simandl et al. |
| 5,856,426 | A |   | 1/1999  | Takahashi et al. |
| 7,351,339 | B2 |  | 4/2008  | Maase et al. |
| 7,605,297 | B2 |  | 10/2009 | Maase et al. |
| 7,767,852 | B2 |  | 8/2010  | Volland et al. |
| 2005/0288484 | A1 | | 12/2005 | Holbrey et al. |
| 2008/0083606 | A1 | | 4/2008  | Volland et al. |
| 2009/0311929 | A1 | | 12/2009 | Schuette et al. |
| 2010/0048829 | A1 | * | 2/2010 | D'Andola et al. ............ 525/418 |
| 2010/0090365 | A1 | | 4/2010  | Schuette et al. |

FOREIGN PATENT DOCUMENTS

| DE | 4009865 A1       | 10/1991 |
|----|------------------|---------|
| DE | 10202838 A1      | 8/2003  |
| DE | 10233703 A1      | 2/2004  |
| EP | 0038094 A2       | 10/1981 |
| EP | 0038582 A2       | 10/1981 |
| EP | 0039524 A1       | 11/1981 |
| EP | 129195 A2        | 12/1984 |
| EP | 129196 A2        | 12/1984 |
| GB | 2451046 A        | 1/2009  |
| JP | 2003-034733 A    | 2/2003  |
| WO | WO-02/079269 A1  | 10/2002 |
| WO | WO-03/029329 A2  | 4/2003  |
| WO | WO-2004/084627 A2 | 10/2004 |
| WO | WO-2005/007657 A2 | 1/2005  |
| WO | WO-2005/017001 A1 | 2/2005  |
| WO | WO-2005/017252 A1 | 2/2005  |
| WO | WO-2005/019137 A1 | 3/2005  |
| WO | WO-2007/128268 A2 | 11/2007 |
| WO | WO-2008/043837 A1 | 4/2008  |
| WO | WO-2008/061942 A2 | 5/2008  |
| WO | WO-2008/077786 A1 | 7/2008  |

* cited by examiner

*Primary Examiner* — Leo B Tentoni
(74) *Attorney, Agent, or Firm* — Drinker Biddle & Reath LLP

(57) ABSTRACT

A process for producing porous structures from polyamide by dissolving the polyamide in an ionic liquid and precipitating or coagulating the dissolved polyamide by contacting the solution with a liquid precipitant medium. Fibers are produced from the dissolved polyamide in a wet-spinning process by precipitation in protic solvents, in particular water, a C1-4-alkanol or mixtures thereof, and subsequent freeze-drying. Foils, films or coatings are produced by blade coating the dissolved polyamide onto a substrate surface, optionally spraying with protic solvent, in particular water, a C1-4-alcohol or mixtures thereof, dipping into a precipitation or coagulation bath, freeze-drying of the resulting foil, of the film or of the coated substrate. Molded parts are prepared by extracting the dissolved polyamide with protic solvents, preferably water, a C1-4-alcohol or mixtures thereof, wherein the dissolved polymer is transformed to a solid or wax-like state by cooling and extracted after subsequent molding.

12 Claims, No Drawings

METHOD FOR PRODUCING POROUS STRUCTURES FROM SYNTHETIC POLYMERS

CROSS-REFERENCE TO RELATED APPLICATIONS

This application is a national stage application (under 35 U.S.C. §371) of PCT/EP2009/051576, filed Feb. 11, 2009, which claims benefit of European application 08151251.9, filed Feb. 11, 2008.

FIELD OF THE INVENTION

The present invention relates to processes for producing porous structures from synthetic polymers, to such porous structures and to their use.

BACKGROUND OF THE INVENTION

Processes for producing polymeric foams are well known. DE-A-102 33 703 relates to such a process for producing nanocellular polymeric foams having cell sizes of 1 µm or less wherein a polymer is dissolved in a sublimable solvent, the polymer solution is cooled within not more than two seconds to a temperature below the melting point of the solvent to obtain a frozen mixture and the frozen solvent is removed by freeze drying to obtain a nanocellular polymeric foam. Polyamides are mentioned as well as numerous polymers, while the examples concern polystyrene.

U.S. Pat. No. 5,300,272 relates to the production of microcellular carbon foam having open porosity. The precursor for the carbon foam is prepared by the phase inversion of a polyacrylonitrile in a solution consisting essentially of an alkali metal halide and a phase inversion solvent for the polyacrylonitrile. Propylene carbonate in particular is used as solvent.

J. H. Aubert and R. L. Clough in Polymer, 1985, vol. 26, pages 2047 to 2054, describe the production of polystyrene foams having a microporous open-cell structure. The polystyrene is dissolved in a solvent such as cyclohexane, then the solution is devolatilized and thereafter rapidly cooled, freezing the solvent. The solvent is then removed by freeze drying to leave the polymer behind as a foam.

U.S. Pat. No. 4,118,449 describes the production of microcellular cellulose acetate foam wherein cellulose acetate is dissolved in an acetone-based solvent, the solution obtained is converted into a gel in a water bath by cooling, and the gel is freeze dried, which causes the water and the solvent to sublime and the gel structure to solidify into a microcellular foam.

DE-A-40 09 865 describes the production of hollow polyacrylonitrile fibers for membrane applications that have an asymmetrical pore structure in the sheath. A polyacrylonitrile solution in DMF is extruded together with glycerol as core liquid, and then precipitated in water to form the hollow filament.

It is known from US-A-2005 0288484 to use ionic liquids as solvents for different polymers to precipitate polymer blends by subsequent addition of a nonsolvent. The blends are based on cellulose.

Porous polymeric structures are required for a multiplicity of uses, for example in filter and membrane technology and also in the medical sector. The need is frequently for ideally uniform microporous, open-cell foams, particularly in the form of fibers.

BRIEF SUMMARY OF THE INVENTION

The present invention has for its object to provide processes for producing porous structures from synthetic, for example thermoplastic, polymers. The present invention further has for its object to provide novel such porous structures.

We have found that this object is achieved according to the present invention by a process for producing porous structures selected from porous fibers, foils, films, coatings or moldings, from synthetic, for example thermoplastic, polymers by dissolving the polymer in an ionic liquid and precipitating or coagulating the dissolved synthetic polymer by contacting the solution with a liquid precipitant medium.

We have found that this object is also achieved by porous structures selected from fibers, foils, films, coatings or moldings, of polymers that are obtainable by the above process.

We have found that this object is also achieved by porous structures of polyamide having an open pore structure in which the strut widths between the pores are in the range from 10 to 500 nm, the average pore or passageway diameter is in the range from 10 to 2000 nm and the water retention capacity is in the range from 100 to 1000%, based on the polyamide.

We have found that this object is also achieved by the use of porous structures for producing membranes, filters, sizes, bonding primers, support materials, hygiene articles, insulating materials or for finishing textiles.

The inventors found that synthetic, for example thermoplastic, polymers dissolved in ionic liquids can be converted into porous structures by being precipitated out. Porous fibers are obtainable in this way by wet spinning, while foils and films or coatings are obtainable by blade coating the dissolved polymer onto a substrate surface and subsequent dipping into a precipitation or coagulation bath. Spraying with water or treatment with water vapor prior to dipping into the precipitation or coagulation bath gives a porous surface, whereas a substantially closed surface, having only occasional pores, is obtained otherwise.

It is thus possible for textile substrates such as wovens, knits and nonwovens to be endowed with coatings which lead to specific properties on the part of the textiles, for example an ability to take up and bind water, permeability to water vapor and impermeability to wind or water.

By extraction of the ionic liquid with a protic solvent porous moulded parts can be obtained.

There now follows a description of, first, the polymers and ionic liquids preferred for the process of the present invention and then of the production process and of the properties of the porous structures obtained. The dissolving of polymers in ionic solvents is known per se, see US-1-2005 0288484.

DETAILED DESCRIPTION OF THE PREFERRED EMBODIMENTS

The present invention provides for the production of porous structures selected from porous fibers, foils, films, coatings or moldings of synthetic, for example thermoplastic, polymers. Any suitable, synthetic polymers can be used, such as polyoxymethylene homo- or copolymers, polycarbonates, polyesters, polyolefins, polyacrylates, polymethacrylates, polyamides, vinylaromatic polymers, polyphenylene ethers, polyurethanes, polyisocyanurates and polyureas, polylactides, thermoplastic elastomers (TPEs), halogenated polymers such as PVC, polymers comprising imide groups, cellulose esters, silicone polymers and mixtures or blends thereof. DE-A-102 33 703, for example, may be referred to for a description of the polymers.

It is particularly preferable to use polyamides. Any polyamides may be contemplated for use, for example aliphatic, partly aromatic or wholly aromatic polyamides, which may be amorphous, partly crystalline or wholly crystalline. The polyamides may have any suitable viscosities or molecular weights.

Polyamides (PAs)

Polyamides of aliphatic partly crystalline or partly aromatic and also amorphous construction of any kind and their blends, including polyether amides such as polyether block amides, are suitable. Polyamides for the purposes of the present invention include all known polyamides.

The relative viscosity (RV) of such polyamides, when determined in a 1% by weight solution in 96% sulfuric acid at 25° C. as per ISO 307, is generally in the range from 1.5 to 10, preferably in the range from 3.0 to 8.0 and particularly in the range from 3.3 to 7.0. These values apply to nylon 6 in particular. Semicrystalline or amorphous resins having a weight average molecular weight of at least 5000, as described for example in U.S. Pat. Nos. 2,071,250; 2,071,251; 2,130,523; 2,130,948; 2,241,322; 2,312,966; 2,512,606; and 3,393,210, are preferred. Examples thereof are polyamides derived from lactams having 7 to 13 ring members, such as polycaprolactam, polycaprylolactam and polylaurolactam, and also polyamides obtained by reaction of dicarboxylic acids with diamines.

Useful dicarboxylic acids include alkanedicarboxylic acids having 6 to 12, in particular 6 to 10 carbon atoms and aromatic dicarboxylic acids. Adipic acid, azelaic acid, sebacic acid, dodecanedioic acid (=decanedicarboxylic acid) and terephthalic and/or isophthalic acid may be mentioned here as acids.

Useful diamines include in particular alkanediamines having 6 to 12, in particular 6 to 8 carbon atoms and also m-xylylenediamine, di-(a-aminophenyl)methane, di-(4-aminocyclohexyl)methane, 2,2-di(aminophenyl)propane or 2,2-di-(4-aminocyclohexyl)-propane.

Preferred polyamides are polyhexamethyleneadipamide (nylon 66, PA 66) and polyhexamethylenesebacamide (PA 610), polycaprolactam (nylon 6, PA 6) and also copolyamides 6/66, in particular comprising from 5% to 95% by weight of caprolactam units. PA 6, PA 66 and copolyamides 6/66 are particularly preferred.

There may also be mentioned polyamides obtainable for example by condensation of 1,4-diaminobutane with adipic acid at elevated temperature (nylon-4,6). Methods of making polyamides of this structure are described for example in EP-A 38 094, EP-A 38 582 and EP-A 39 524.

Further examples are polyamides obtainable by copolymerization of two or more of the aforementioned monomers, or mixtures of two or more polyamides, in which case the mixing ratio is freely chooseable.

Such partly aromatic copolyamides as PA 6/6T and PA 66/6T will also be found particularly advantageous, since they can be processed irrespective of the triamine content. The production of partly aromatic copolyamides having a low triamine content, for example, can be carried out by following the processes described in EP-A 129 195 and 129 196.

The following, nonconclusive schedule comprises the polyamides mentioned and also further polyamides within the meaning of the invention (the monomers are reported between parentheses):
PA 46 (tetramethylenediamine, adipic acid
PA 66 (hexamethylenediamine, adipic acid)
PA 69 (hexamethylenediamine, azelaic acid)
PA 610 (hexamethylenediamine, sebacic acid)
PA 612 (hexamethylenediamine, decanedicarboxylic acid)
PA 613 (hexamethylenediamine, undecanedicarboxylic acid)
PA 1212 (1,12-dodecanediamine, decanedicarboxylic acid)
PA 1313 (1,13-diaminotridecane, undecanedicarboxylic acid)
PA MXD6 (m-xylylenediamine, adipic acid)
PA TMDT (trimethylhexamethylenediamine, terephthalic acid)
PA 4 (pyrrolidone)
PA 6 (ε-caprolactam)
PA 7 (ethanolactam)
PA 8 (caprylolactam)
PA 9 (9-aminoundecanoic acid)
PA 12 (laurolactam)

These polyamides and their preparation are known. Details concerning their preparation can be found in Ullmanns Encyklopädie der Technischen Chemie, 4$^{th}$ edition, vol. 19, pp. 39-54, Verlag Chemie, Weinmann 1980, and also Ullmann's Encyclopedia of Industrial Chemistry, vol. A21, pp. 179-206, VCH Verlag, Weinheim 1992, and also Stoeckhert, Kunststofflexikon, pp. 425-428, Hanser Verlag Munich 1992 (head word "Polyamide" and following).

Particular preference is given to using nylon-6, nylon-66 or MXD6 polyamide (adipic acid/m-xylylenediamine).

Ionic Solvents

The synthetic, for example thermoplastic, polymers, in particular polyamides, are dissolved in any suitable ionic liquids which have sufficient solvent power for the polymers and sufficient thermal stability. Suitable ionic liquids are described for example in US-A-2005 0288 484 and WO 02/079269.

Ionic liquids are a group of solvents which are constructed of anions and cations, in contrast to traditional organic or aqueous solvents, which are molecular nonionics. Ionic liquids are increasingly used to replace customary vaporizable organic compounds. Ionic liquids are typically constructed with an organic cation, which is frequently obtained by alkylation of a compound, for example imidazoles, pyrazoles, thiazoles, isothiazoles, azathiazoles, oxothiazoles, oxazines, oxazolines, oxazaboroles, dithiozoles, triazoles, selenozoles, oxaphospholes, pyrroles, boroles, furans, thiophenes, phospholes, pentazoles, indoles, indolines, oxazoles, isoxazoles, isotriazoles, tetrazoles, benzofurans, dibenzofurans, benzothiophenes, dibenzothiophenes, thiadiazoles, pyridines, pyrimidines, pyrazines, pyridazines, piperazines, piperidines, morpholones, pyrans, anolines, phthalazines, quinazolines, quinoxalines and combinations thereof.

The anionic portion of the ionic liquid can be constructed of inorganic or organic anions. Typical examples thereof are halides, $BX_4^-$, $PF_6^-$, $AsF_6^-$, $SbF_6^-$, $NO_2$, $NO_3$, $SO_4^{2-}$, $BR4^-$, substituted or unsubstituted carboranes, substituted or unsubstituted metallocarboranes, phosphates, phosphites, polyoxometalates, substituted or unsubstituted carboxylates like acetate, triflates and noncoordinating anions. R may comprise hydrogen, alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxyaryloxy, acyl, silyl, boryl, phosphino, amino, thio, seleno and combinations thereof. By altering the combination of cations and anions, one has the ability to fine-tune the ionic liquid with the desired solvent properties needed for a specific thermoplastic polymer.

Ionic liquids have a more complex solvent behavior compared with traditional aqueous and organic solvents, since ionic liquids are salts and not molecular, nonionic solvents. For interactions between ionic liquids and dissolved polymers, reference may be made to US-A-2005 0288 484, paragraph [0039]. Ionic liquids are preferably in the liquid phase in a temperature range of −70 to 300° C. They should be thermally stable to preferably at least 100° C., preferably at least 150° C. and particularly at least 170° C. Nylon-6 pellet, for example, is dissolved at a temperature of 170° C. to obtain a 20% by weight solution.

The cation may be for example a single five-membered ring free of fusion to other ring structures. One example thereof is an imidazolium cation. In this case, the anion of the ionic liquid may be a halogen or pseudohalogen. For further description, reference may be made to US-A-2005 0288 484, paragraphs [0055] to [0062].

Room temperature ionic liquids useful in the present invention are described for example in WO 02/079269 at pages 13 to 16. Cations specified there include for example large, asymmetric organic cations such as N-alkylpyridinium, alkylammonium, alkylphosphonium and NN'-dialkylimidazolium. The ionic liquids preferably have high stability and more preferably have a decomposition temperature in excess of 400° C. For example, dialkylimidazolium and alkylpyridinium have such high decomposition temperatures. 1-Alkyl-3-methylimidazolium salts may be particularly preferable, in which case $PF_6^-$, for example, is a suitable counter-ion.

Further suitable ionic liquids are described in PCT/EP 2007/060881, which has an earlier priority date than the present invention but was unpublished at the priority date of the present invention.

For further descriptions of ionic liquids, reference may be made to Angew. Chem. 2000, 112, 3926 to 3945, K. N. Marsh et al., Fluid Phase Equilibria 219 (2004), 93 to 98 and J. G. Huddleston et al., Green Chemistry 2001, 3, 156 to 164 and also DE-A-102 02 838, WO 2005/019137, WO 2005/007657, WO 03/029329, WO 2004/084627, WO 2005/017001 and WO 2005/017252. For example, WO 2005/007657 describes salts of 1,5-diazabicyclo[4.3.0] non-5-ene (DBN) and 1,4-diazabicyclo[5.4.0] undec-7-ene (DBU), WO 2004/084627 describes for example, as cations, cyclic amine bases such as pyridinium, pyridazinium, pyrimidinium, pyrazinium, imidazolium, pyrazolium, oxazolium, 1,2,3- and 1,2,4-triazolium, thiazolium, piperidinium, pyrrolidinium, quinolinium and isoquinolinium. Suitable counter-ions for 1,8-diazabicyclo [5.4.0] undec-7-enium (DBU) include for example chloride, methanesulfonate, formate, acetate, tosylate, trifluoroacetate, saccharinate, hydrogensulfate, lactathiocyanate and trifluoromethanesulfamate. The DBU ion may be substituted for example by $C_{1-12}$-alkyl radicals, in particular $C_{4-8}$-alkyl radicals. For example, 8-butyl DBU or 8-octyl DBU may be used as cation.

In accordance with the present invention, the cation used in the ionic liquid is particularly preferably a substituted or unsubstituted imidazolium cation, a substituted or unsubstituted 1,8-diazabicyclo[5.4.0] undec-7-enium cation or a mixture thereof. Useful substituents include in particular alkyl substituents, for example $C_{1-10}$-alkyl substituents. $C_{1-4}$-Alkyl substituents, in particular ethyl and methyl, are preferable for imidazolium ions. In this case, it is particularly preferable to use ethylmethylimidazolium (EMIM) as cation. It may further be preferable to use butylmethylimidazolium (BMIM) as cation. In the case of 1,8-diazabicyclo[5.4.0] undec-7-enium cations, it is preferable to use $C_{3-10}$-alkyl substituents, in particular $C_{4-8}$-alkyl substituents. Particular preference is given here to 8-butyl DBU and 8-octyl DBU and also mixtures thereof.

The above-described anions can be used as anions for the imidazolium salts. Preferred counter-ions are preferably selected from halide, substituted or unsubstituted $C_{1-4}$-carboxylate like acetate, phosphate, $C_{1-4}$-alkyl phosphate, di-$C_{1-4}$-alkyl phosphate, $C_{1-4}$-alkylsulfonate, hydrogensulfate or mixtures thereof.

It is particularly preferable for the ionic liquid to be ethylmethylimidazolium diethylphosphate (EMIM DEP) and methylmethylimidazolium dimethylphosphate (MMIM DMP) or mixtures thereof or ethylenethylimidazolium acetate (EMIM Acetate). The ionic liquid may also comprise minor proportions of water. For example, the water content of the ionic liquid may be in the range from 0% to 10% by weight.

The thermal stability of the ionic liquid is chosen as a function of the flowability of the solution of the polymer in the ionic liquid. Since the processing of the polymer solution in the ionic liquid presupposes a liquid phase, the solution may have to be heated to keep it in the liquid state. The thermal stability of the ionic liquid preferably amounts to about 200° C. or 150° C. for high concentrations. Such elevated temperatures are frequently necessary in this case in order that the solution of the thermoplastic polymer in the ionic liquid may be kept liquid. The concentration of the thermoplastic polymer in the ionic liquid is freely choosable within wide limits. It is preferably in the range from 10% to 40% by weight and in particular in the range from 15% to 30% by weight.

The polymer solution is preferably prepared by introducing polymer pellet into the ionic liquid at a suitable dissolution temperature with stirring. It is also possible to introduce a melt of the polymer into the ionic liquid. The production of solutions of thermoplastic polymers in ionic liquids is known in principle from the prior art described at the beginning, although the examples therein do not relate to polyamide.

The viscosity particularly of a solution of polyamide in an ionic liquid is freely choosable within wide limits.

It may further be preferable to use polyamides formed from dicarboxylic acids and diamines, in particular those formed from $C_{4-10}$ dicarboxylic acids and $C_{4-10}$ diamines; nylon-6,6 is used here in particular.

It is also possible to use mixtures of polymers. The synthetic polymer may for example be mixed with a polymer in solution, in particular as a blend with biopolymers.

Porous structures according to the present invention which are in the form of fibers are preferably produced in a wet-spinning process from the dissolved synthetic polymer, in particular polyamide, by precipitation in a protic solvent, for example water, a $C_{1-4}$-alkanol or mixtures thereof and subsequent drying. The processing temperature at spinning is in the range from 10 to 250° C., preferably in the range from 80 to 200° C. and more preferably in the range from 90 to 150° C., in particular in the processing of nylon-6.

The wet-spinning process may be carried out in any suitable manner. For a closer description, reference may be made for example to B. Falkai, Synthesefasern—Grundlagen, Technologie, Verarbeitung and Anwendung, Verlag Chemie, Weinheim 1981, pages 87 to 137.

The spinning speed (take-off speed) is preferably in the range from 10 to 500 m/min, more preferably in the range from 20 to 250 m/min and in particular in the range from 150 to 250 m/min.

The spinneret die preferably has holes having a diameter in the range from 40 to 400 μm.

In one version of the process, an air gap is preferably provided between the die and the coagulation bath, for example in a length of 0.5 to 10 cm, preferably 1 to 6.5 cm and more preferably about 1 cm. The coagulation bath used is preferably a precipitant bath comprising a polar precipitant medium, for example water, which is at ambient temperature for example. The spinning temperature for nylon-6 is preferably in the range from 125 to 150° C.

After coagulation and removal of the IL preferably in a wash bath comprising preferably water, alcohols or polar solvents, the fiber obtained is dried. This is preferably done by freeze drying, which prevents sticking together of the fibers during drying and promotes the formation of the porous structure. High-porosity polyamides in particular can be observed to provide very high water retention values (WRVs) of up to 300% in the fibers. After coagulation, the fiber may be subjected to in-process drawing before and/or after washing. Drawing during drying is additionally possible. Drawing may take place in air, in a drawing bath, on a heating rail, between heated godets or in a heating duct.

The ionic liquid may be separated from the precipitant medium by distillation, for example, and then recycled.

In accordance with the present invention, solution extrusion through an extruder can also be used for producing the fibers and also foils.

The fibers obtained preferably have the following property portfolio:

The fibers comprise an open-cell foam which, depending on the precipitation system, may also be open-cell or closed at the surface, pores being present in the latter case. Struts form, since the ionic liquid takes up water and the polyamide no longer dissolves in the mixture. Particularly treatment of the surface with water vapor gives a sufficiently open-cell structure, whereas treatment in a water bath gave an almost closed surface.

Strut width in the open-cell foam is preferably in the range from 10 to 500 nm, more preferably in the range from 20 to 300 nm and in particular in the range from 50 to 100 nm. The average pore diameter or as the case may be the passageway size is preferably in the range from 10 to 2000 nm, more preferably in the range from 50 to 500 nm and in particular in the range from 100 to 200 nm.

Water retention capacity is preferably in the range from 100 to 1000%, more preferably in the range from 150 to 500% and in particular in the range from 200 to 400%. Water retention capacity is determined in accordance with German standard specification DIN 53814.

Water vapor sorption (WVS) is preferably 2.0 to 4.0% at 20° C. and 65% relative humidity. The measurement is carried out by storing the fibers or films at 20° C. and 65% relative humidity for 1 day before they are weighed and dried at 105° C. for 2 hours and the adsorbed amount of water is determined gravimetrically to constant weight.

$$WVS \% = (m_{conditioned} - m_{dry})/m_{dry}$$

The following values were additionally determined on foils and coatings:

The DIN 53122 water vapor transmission rate is preferably in the range from 1000 to 4000 g/m² per day.

Internal surface area is preferably >than 10 m²/g and more preferably in the range from 50 to 300 m²/g. It is determined by mercury porosimetry.

Tenacity is preferably in the range from 1 to 30 cN/tex and more preferably in the range from 5 to 20 cN/tex.

Breaking extension is preferably in the range from 5 to 300% and more preferably in the range from 10 to 200%.

Linear density can be set within wide limits. Preference is given to individual filament linear densities in the range from 0.5 to 4000 dtex.

The fibers may be further processed into any desired textile articles of manufacture, for example into nonwovens, wovens, knits, etc.

Such fabrics are notable for good properties with regard to air permeability, water vapor sorption, water tightness and water vapor permeability, making them very useful for producing textiles for the outdoor sector.

Foils, films or coatings are produced according to the present invention via the customary technologies, for example blade coating the dissolved, for example thermoplastic, polymer onto a substrate surface, optionally spraying with a protic solvent, for example water, a $C_{1-4}$-alkanol or mixtures thereof, dipping into a precipitation or coagulation bath, subsequent drying of the resulting foil, of the film or of the coated substrate.

Optionally, the foil is drawn, similarly to the aftertreatment of the fibers.

Application temperature is preferably in the range from 0 to 250° C. and more preferably in the range from 20 to 200° C.

The thickness of foils or films produced according to the present invention is fine tunable and, in accordance with the planned use, is preferably in the range from 5 to 1000 μm and more preferably in the range from 10 to 100 μm.

In one preferred embodiment of film production, coagulation in a coagulation bath, generally comprising a protic solvent, for example water, a $C_{1-4}$-alkanol or mixtures thereof, may be preceded by vapor treatment with a protic solvent, for example water, a $C_{1-4}$-alkanol or mixtures thereof. To obtain very substantially closed surfaces, dipping into the coagulation bath is carried out immediately.

Even the film having a substantially closed-pore surface is notable for high air permeability, which increases still further for the open-pore film.

The film may be produced for example by drying under reduced pressure or else by freeze drying. As well as water as a precipitant, one embodiment of the present invention may also utilize short-chain alcohols, for example ethanol, as a precipitant. The films can be coagulated even when such alcohols are used. As well as the process-engineering advantage of a retarded coagulation compared with water, alcohol has a further advantage in that the recycling of the ionic liquids used is simplified. The workup of the ionic liquids is simplified because the ionic liquid is easier to dry by virtue of the lower-boiling alcohols. To produce porous structures having a substantially porous surface, it is advantageous for the film, for example blade coated onto a hot glass plate from an as described hot solution, to be treated with water vapor for a period ranging from 1 to 20 minutes, preferably from 2 to 10 minutes and in particular from 3 to 7 minutes, and only then be dipped into a precipitant or coagulation bath. A film thus produced and freeze dried displays the described porous structure on the inside and also has an open-pore surface.

To produce porous coatings, the solution of a preferably polar polymer is as described above blade coated onto a woven, knit or nonwoven fabric which may consist for example of polyamide, polyester, polypropylene or some other synthetic or natural fiber. The dissolved polar polymer is then sprayed with water, alcohol or a mixture thereof, with or without admixture of ionic liquids, and then dipped into a precipitant or coagulation bath. The polymer precipitates and the coating thus obtained is notable for good fabric attachment. The coating displays a uniformly porous structure, similar or identical to the structure described above for fibers. It is possible, for example, for an inherently hydrophobic polypropylene fabric to be rendered hydrophilic by being coated according to the present invention.

Specifically the coating of fabrics makes it possible to adjust air permeability, water vapor sorption, water tightness and water vapor permeability such that the properties of a performance textile such as Goretex® or Sympatex® are obtained. What is more, the properties of these membranes can be exceeded.

Add-on is preferably in the range from 5 to 500 μm, more preferably in the range from 10 to 400 μm and in particular in the range from 20 to 200 μm.

Fabrics thus coated preferably have a DIN 53887 air transmission rate in the range from 0 to $4\mathrm{l m^{-2} s^{-1}}$ and more preferably in the range from 0.01 to $2\mathrm{l m^{-2} s^{-1}}$.

Water vapor sorption in the case of such fabrics is preferably in the range from 2 to 4% at 20° C. and 65% relative humidity. The water vapor transmission rate is preferably in the range from 1000 to 4000 g m$^{-2}$ per day and more preferably in the range from 1500 to 3000 g m$^{-2}$ per day.

The microporosity achievable according to the invention for polyamide coatings produced by coagulation provides new perspectives for coatings based on synthetic polymers. In the performance apparel sector, hydrophilic coatings of polyamide can circumvent many of the disadvantages known from current hydrophilic coatings. More particularly, moisture management can be improved, scuff resistance can be increased, soiling through migration can be reduced and problems with the adhesion and optimal rheology control for coating pastes can be avoided.

In accordance with the present invention, glass fibers or other industrial fibers can be coated with the porous structures, in particular polyamides, of the present invention for the purpose of achieving better bonding.

It is also possible to chemically modify or functionalize the polymers, in particular polyamides, used for fiber production, film and foil production or for coating. Bonding and hydrophilic properties can be modified in such a way for example. Modification can even be effected in the course of polyamide production or in the polyamide solution in the ionic liquid. It is possible, for example, to modify polyamide coatings by attachment of cyclodextrins by means of known triazine-based reactive hooks or by attachment of further substances which serve as storage media for active components.

In the same way as fibers, foils and films, three-dimensional porous structures such as molded forms are obtainable according to the present invention by precipitation from a polymer solution in the ionic liquid. Such molded forms may have any desired suitable shape. When the ionic liquid is stirred during the precipitation step, spheres or elliptical structures are obtainable for example.

In a preferred process the preparation of porous moulded parts is performed by extracting the dissolved polymers with protic solvents, especially water, a $C_{1-4}$-alcohol or mixtures thereof, and subsequent drying in order to produce moulded parts.

First the polymer is dissolved in the ionic solvent. Subsequently, the dissolved polymer can be transferred to a solid or wax-like state by cooling, which allows for the moulding. After the subsequent moulding the extraction can be performed. The flowable solution of the polymer in the ionic solvent can be injected or cast in suitable moulds or can be solidified on cooling belts in a flat form. These flat forms can thereafter be broken, sawn or transferred in single moulds by other break-up processes. After the respective moulding the mould present in solid or wax-like form made from ionic liquid and polymer can be extracted.

For extraction all suitable extraction apparatus can be employed. Suitable apparatus are known to the person skilled in the art, for example soxhlet-extractors.

These extractions can be performed at suitable temperatures. Preferably, the extraction takes place at a temperature which corresponds to the boiling point of the protic solvent ±10° C., preferably ±5° C. Preferably, the moulded part to be extracted is put in a heatable container through which the extracting solvent flows. The extracting solution is thus heated up and pumped through the container with the moulded part, optionally under inert gas. The apparatus can furthermore be employed with a cooling system for condensing possibly evaporating extraction agent or ionic liquid. Typically, the extraction agent is heated to a temperature above the boiling point under stirring. By pumping the extraction agent, only a fraction thereof is present in the heating or stirring container. For extracting a multitude of moulded parts at the same time, preferably by employing smaller moulded parts or flat substrates cut down, the small moulded parts or substrates can be introduced in a mesh box or mesh-like container or a container with retaining meshes, which is placed in a heating medium and through which the extraction solvent flows.

Apart of the extraction solution can be replaced by fresh extraction solvent continuously or in defined time intervals in order to remove the extracted ionic solvent.

After finishing the extraction which can be observed by continuous or intermittent analysis of the extraction agent, the porous moulded parts can be removed from the container and dried. It is for example possible to remove polyamide moulded parts after the extraction, to slurry them in acetone, filtrate them over filtering means and break up afterwards. Starting from polyamides, porous powders can be obtained which are very similar to the product Orgasol® of Arkema. It is possible to add fillers like inorganic fillers like titandioxide in particle form already to the polymer matrix, so that they are also present in the final porous product.

The porous structures of the present invention can be used in a multiplicity of applications. They are useful for example for producing membranes, filters, sizes, bonding primers, support materials, hygiene articles, insulating materials or for finishing textiles. For example, the porous structures can be used as supports for functional groups or, for example, catalysts, adsorbent molecules, etc. They can also be used for desorption of active components. A further field of use is as a glass fiber size.

For example, surfaces can be hydrophilicized with the porous structures of the present invention, for example by coating fabrics, films, etc. The porous structures having an open surficial structure are useful as a filter medium for gases, in which case particularly the excellent properties of an engineering plastic, for example the high service temperature, will prove advantageous. Films having an open surficial structure can be used as a filter medium for liquids. The porous structure can be used as a size for coating reinforcing fibers before use in fiber composites, in particular before use in fiber-reinforced polyamide. The porous structures can serve as storage media having a large internal surface area for release of active components, and also as an adsorbent having a large internal surface area for accommodating impurities.

The examples which follow illustrate the invention.

EXAMPLES

Production of Polymer Solutions

Polymer solutions in ionic liquids were produced by introducing the corresponding amount at the temperature reported in the table below. Stable solutions were obtained in each case.

| Ionic liquid | Polymer | Concentration in % by weight | Temperature |
|---|---|---|---|
| MeDBU(+) Me2PO4(−) | nylon-6; RV 5.0 | 20 | 120 |
| | nylon-6; RV 2.4 | 15 | 90 |
| | nylon-6; RV 2.4 | 25 | 120 |
| | nylon-6,6; RV 2.7 | 15 | 120 |
| | nylon-6/6T; VN 130 (0.5% in 96% H$_2$SO$_4$) | 30 | 90 |
| | MXD6, RV 3.1 | 30 | 90 |
| | Polyether sulfone (PES) | 20 | 90 |
| EMIM-DEP | nylon-6/6T; VN 130 (0.5% in 96% H$_2$SO$_4$) | 20 | 110 |
| | nylon-6; RV 5.0 | 20 | 120 |
| | MXD6 | 35 | 110 |
| | nylon-6; RV 5.0 | 30 | 170 |
| BMIM-Cl | nylon-6/6T; VN 130 (0.5% in 96% H$_2$SO$_4$) | 25 | 150 |
| | MXD6, RV 3.1 | 45 | 150 |
| BMIM-Acetate | nylon-6; RV 5.0 | 5 | 100 |
| | nylon-6; RV 2.4 | 5 | 100 |
| | nylon-6/6T; VN 130 | 20 | 100 |

-continued

| Ionic liquid | Polymer | Concentration in % by weight | Temperature |
|---|---|---|---|
| | (0.5% in 96% H$_2$SO$_4$) | | |
| | MXD6 | 40 | 110 |
| BMIM-Me2PO4 | nylon-6; RV 5.0 | 10 | 150 |
| | nylon-6; RV 2.4 | 15 | 150 |

The dissolution temperature was adapted to the particular amount of polymer dissolved. For dissolution on a laboratory scale, the solvent was initially charged in a two-neck round-bottom flask equipped with a KPG stirrer. The polyamide was added with stirring over 10 min and suspended. The dissolution temperature was then set with an oil bath within a period of 30 minutes. This was followed by stirring at the desired temperature at 160 revolutions/min for three hours. This was followed by hot filtration, devolatilization under reduced pressure and storage at ambient temperature. Since there were virtually no filter residues, filtration was omitted for the rest of the process. The solutions exhibited structural viscosity in the region of the dissolution temperature and were easy to handle, for example to transfer and process. EMIM DEP proved by virtue of its stability and dissolving power to be an outstandingly suitable solvent for processing different types of polyamide.

Spinning

A plunger-type spinning apparatus having a capacity of 100 ml and a 40-5 µm metal sieve as filter was used. The spinneret die used had 28 holes of 80 µm each, and the air gap was 1 cm. The coagulation bath used had two deflecting rollers (80 cm) and contained water at a temperature of 20° C. Take-off godet and draw godet could be operated at variable speeds, the draw bath used being water at a temperature of 80° C. The length of the draw bath was 1 m. This was followed by drying on a drying godet at 60° C., alternatively by freeze drying.

The spinning temperature for spinning nylon-6 was up to 170° C. The fibers were typically taken off at a speed of 60 m/min directly after coagulation. Drying was typically by freeze drying as well as godet.

TABLE 1

Fiber properties as a function of spinning parameters

| Run | 1 | 2 | 3 | 4 |
|---|---|---|---|---|
| Experimental | | | | |
| PA type | nylon-6 | nylon-6 | nylon-6 | nylon-6 |
| Solution conc. [% by weight] | 20 | 20 | 20 | 20 |
| Die | 28/80 | 28/80 | 28/80 | 28/100 |
| Spinning temperature | 150° C. | 150° C. | 150° C. | 125° C. |
| Air gap | 1 cm | 1 cm | 1 cm | 1 cm |
| V1 [m/min] | 10 | 60 | 13.5 | 6.5 |
| V2 [m/min] | | | | 20 |
| Draw ratio [%] | | | | 207 |
| IL washoff | overnight | overnight | overnight | in draw bath |
| Drying technique | freeze dryer | freeze dryer | freeze dryer | godet 60° C., online |
| Fiber properties | | | | |
| Linear density [dtex] | 442 | 175 | 342 | 210 |
| Tenacity [cN/tex] | 3.1 | 5.1 | 2.4 | 21.2 |
| Breaking extension [%] | 43 | 17 | 92 | 23 |
| WRV [%] | 234 | 210 | 264 | 44 |

As the results show, runs 1 to 3 gave high-porosity fibers. Freeze drying may be one factor responsible for this. In freeze drying, micropores formed in the coagulation may widen and become fixed in that state. The water retention values (WRVs) achievable, up to 300%, are remarkable for polyamide.

The polyamides obtained according to the present invention were subjected to an x-ray analysis. The δ-phase was found to have been formed predominantly. Alternatively, drying in a heating duct at 200° C. was also performed in the after-spinning process. Fractions of the α-form are found on drawing in the heating duct as well as the δ-phase.

Production of Foils and Coatings

Nylon-6 having a relative viscosity RV of 5.0 was dissolved in EMIM DEP at 170° C. in a concentration of 20% by weight and blade coated onto a preheated glass plate. The glass plate was cooled down to room temperature and the samples were coagulated in a precipitant or coagulation bath at RT and washed off. The washed-off samples were dried in air, in a freeze dryer or in a drying cabinet at 60° C. The porous structure of the present invention was obtained in all cases.

Alternatively, ethanol was used as precipitant. Using ethanol, it was possible to coagulate the films with formation of the porous structure. The coagulated film was freeze dried and likewise had an excellent porous structure. Table 2 gives an overview of the films investigated.

TABLE 2

| Sample | Coagulation/drying | Add-on (μm) | Film thickness (nm) |
|---|---|---|---|
| 20% N6 | H₂O/eth./fr. dried | 60 | 11 |
| | H₂O/eth./oven 60° C. | 60 | 21 |
| | H₂O/oven 60° C. | 200 | 80 |
| | H₂O/air | 100 | 13 |
| | H₂O/eth./air | 60 | 20 |
| | H₂O/fr. dried | 100 | 22 |
| | H₂O/fr. dried | 60 | 16 |
| 10% N66 | H₂O/eth./air | 400 | 160 |
| | H₂O/air | 400 | 70 |
| | H₂O/air | 60 | 10 |
| | H₂O/fr. dried | 400 | 130 |
| | H₂O/fr. dried | 60 | 40 |

Characterization of Films:

1. Air Permeability

Performance of permeability test to DIN 53887.

TABLE 3

Air permeability of films

| Sample | Coagulation/drying | ATR (l/m²/s) mean |
|---|---|---|
| 20% N6, 60 μm, 0.02 mm | H₂O/ethanol/air | 0.05 |
| 20% N6, 60 μm, 0.016 mm | H₂O/freeze dried. | 0.09 |
| 20% N6, 60 μm, 0.011 mm | H₂O/ethanol/freeze dried | 0.01 |
| 10% N66, 400 μm, 0.16 mm | H₂O/ethanol/air | 1.01 |
| 10% N66, 400 μm, 0.07 mm | H₂O/air | 0.02 |
| 10% N66, 400 μm, 0.13 mm | H₂O/freeze dried | 1.28 |

The foils and coatings have good barrier properties with regard to air/oxygen.

2. Water Vapor Sorption

To quantify the affinity of the films for water vapor, water vapor sorption at 20° C. and 65% relative humidity was determined.

TABLE 4

Water vapor sorption

| Sample | WVS (%) |
|---|---|
| PA films | |
| 20% N6, H2O/eth./freeze dried, add-on 60 μm, film thickness 0.011 mm | 2.84 |
| 20% N6, H2O/eth./oven 60° C., add-on 60 μm, film thickness 0.021 mm | 3.19 |
| 20% N6, H2O/air, add-on 100 μm, film thickness 0.013 mm | 3.25 |
| 20% N6, H2O/eth./air, add-on 60 μm, film thickness 0.02 mm | 2.19 |
| 20% N6, H2O/freeze dried, add-on 100 μm, film thickness 0.022 mm | 2.3 |
| 10% N66, H2O/eth./air, add-on 400 μm, film thickness 0.16 mm | 2.15 |
| 10% N66, H2O/air, add-on 400 μm; film thickness 0.07 mm | 2.82 |

TABLE 4-continued

Water vapor sorption

| Sample | WVS (%) |
|---|---|
| Cellulose films | |
| 6% CEL EMIMAc, H2O/air, 500 μm; film thickness 0.055 mm | 10.44 |
| 3% CEL EMIMCl, H2O/air, 500 μm, film thickness 0.015 mm | 8.4 |
| 6% CEL HDBUAc, H2O/air, 500 μm, film thickness 0.06 mm | 8.9 |
| Cellophane 0.025 mm | 8.2 |

PA films have lower water vapor sorption than the CEL films.

3. Water Vapor Permeability

To obtain information about breathability, the water vapor transmission rate WVTR was determined.

TABLE 5

Water vapor transmission rate

| Films | WVTR [g/m²/24 h] |
|---|---|
| 20% N6, H2O/eth./freeze dried, add-on 60 μm, film thickness 0.011 mm | 3420 |
| 20% N6, H2O/eth./oven 60° C., add-on 60 μm, film thickness 0.021 mm | 1922 |
| 20% N6, H2O/eth./air, add-on 60 μm, film thickness 0.02 mm | 3011 |
| 20% N6, H2O/freeze dried, add-on 100 μm, film thickness 0.022 mm | 3094 |
| 10% N66, H2O/eth./air, add-on 400 μm, film thickness 0.16 mm | 3790 |
| 10% N66, H2O/air, add-on 400 μm, film thickness 0.07 mm | 3337 |
| 10% N66, H2O/freeze dried, add-on 400 μm, film thickness 0.13 mm | 3381 |
| 6% CEL EMIMAc, H2O/air, add-on 500 μm, film thickness 0.05 mm | 3315 |
| Cellophane film thickness 0.025 mm | 179 |
| Sympatex ® (literature) | 2500-2700 |
| Gore-Tex ® (literature) | 4800-6900 |

4. Water Tightness

TABLE 6

| Films | d (mm) | Water tightness (cm hydrohead) |
|---|---|---|
| 20% N6, H2O/freeze dried, add-on 60 μm | 0.020 | 40 |
| 20% N6, H2O/air, add-on 100 μm | 0.013 | 10 |
| 10% N66, H2O/freeze dried, add-on 400 μm | 0.14 | 10 |
| 10% N66, H2O/eth./air, add-on 400 μm | 0.17 | 10 |
| Cellophane | 0.025 | >160 |
| 6% CEL EMIMAc, H2O/air, add-on 500 μm | 0.055 mm | >160 |

PA films exhibit no blocking effect to moisture, unlike the CEL films investigated.

Production of Coatings

Coating trials were carried out by hand using a spreader blade system. The solution of nylon-6 in EMIM DEP was applied at 160° C. in a drying cabinet to a preheated fabric. Care must be taken to ensure that the fabric to be coated does not slip. For this reason, the fabric was secured to the edges of a glass plate by means of double-sided adhesive tape. After the coating had been produced, the glass plate bearing the fabric was cooled down to room temperature. The samples were coagulated and washed off at room temperature in demineralized water or ethanol. The washed-off samples were dried in air, in a freeze dryer or in a drying cabinet at 60° C. The textile fabrics used were woven polyester fabrics, woven polypropylene fabrics, woven cotton fabrics and woven polyamide fabrics. The fabrics were measured for air permeability, water vapor sorption, water tightness and water vapor permeability. Coating morphology was examined by means of scanning electron microscopy as in the case of the foils.

The experimental results are summarized in the table below.

TABLE 7

| Sample | Coagulation/drying | Add-on (μm) | Film thickness (mm) | Substrate |
|---|---|---|---|---|
| 10% N66 | H$_2$O/freeze dried | 60 | 0.03 | PP |
|  | H$_2$O/freeze dried | 60 | 0.03 | PA |
|  | H$_2$O/freeze dried | 60 | 0.03 | PES |
| 10% N66 | H$_2$O/air | 60 | 0.03 | PP |
|  | H$_2$O/air | 60 | 0.03 | PA |
|  | H$_2$O/air | 60 | 0.01 | PES |

Characterization of Coatings:
1. Air Permeability
Performance of air permeability test to DIN 53887.

TABLE 8

Air permeability of coatings

| Sample | Coagulation/drying | Substrate | ATR (l/m$^2$/s) mean |
|---|---|---|---|
| 10% N66, 60 μm | H$_2$O/freeze dried | PP | 1.44 |
|  |  | PES | 1.16 |
|  |  | PA | 0.42 |
| 10% N66, 60 μm | H$_2$O/air | PP | 2.1 |
|  |  | PES | 0.11 |
|  |  | PA | 2.26 |
| Substrate/fabric |  | PP | 254 |
|  |  | PES | 91.4 |
|  |  | PA | 87.1 |

2. Water vapor permeability
To obtain information about breathability, the water vapor transmission rate WVTR was determined.

TABLE 9

Water vapor transmission rate

| Coatings | WDD [g/m$^2$/24 h] |
|---|---|
| Substrate PP | 3376 |
| Substrate PA | 3398 |
| Substrate PES | 3431 |
| Layer thickness 0.03 mm |  |
| 10% N66 H$_2$O/freeze dried, 60 μm, PP | 3326 |
| 10% N66 H$_2$O/freeze dried, 60 μm, PA | 3271 |
| 10% N66 H$_2$O/freeze dried, 60 μm, PES | 3425 |
| 10% N66 H$_2$O/air, 60 μm, PP | 3110 |
| 10% N66 H$_2$O/air, 60 μm, PA | 3110 |
| 10% N66 H$_2$O/air, 60 μm, PES | 3072 |

The samples investigated have very high water vapor permeability.

The microporosity found according to the present invention for the polyamide coatings produced from ionic liquids by coagulation provides new perspectives for coatings based on synthetic polymers. In the performance apparel sector, hydrophilic coatings of polyamide can avoid many of the disadvantages known from current hydrophilic coatings and display improved moisture management, (water vapor permeability in relation to hydrohead), improved scuff resistance, reduced soiling through migration, improved rheology of coating pastes and improved adhesion.

Description of Methods of Measurement:
Water Vapor Sorption

The films to be measured were stored at 20° C. and 65% relative humidity for 1 day, then weighed, dried at 105° C. for 2 hours and the adsorbed amount of water was determined gravimetrically to constant weight:

$$WVS \% = (m_{condition} - m_{dry})m_{dry}$$

Water Tightness

Water tightness is determined in line with German standard specification DIN 53886.

Before starting the measurement, the apparatus is filled with distilled water and the leveling vessel is set to the zero mark. The water level has to be in line with the zero mark and the lower clamp flange. After every refill, care must be taken to ensure that there are no air bubbles in the connecting tube between the water vessel and the clamp.

The film or coated textile sample is placed with the coated side facing down onto the water surface of the clamp flange and screwed together with the upper clamp flange. Thereafter, the leveling vessel is moved upwardly using a motor-driven winch (speed 20 cm/min).

The scale value at which several drops of water pass through the film is noted. The maximum height for the water head is limited by the apparatus to 160 cm.

Water Vapor Permeability

Gravimetric method in line with DIN 53122.

Procedure: Fill dried silica gel (about 130 g) into beaker, clamp on film or sample with coating facing out, determine total weight and place in preconditioned conditioning cabinet (38° C., 90% relative humidity).

Beakers are weighed after 24 h. The weight change after 24 h is computed [g/(m$^2$*d)]. The area is 18.1 cm$^2$ (r=4.8 cm).

Air Permeability

The air permeability test is carried out on a Textest FX 3300 to DIN 53887.

The instrument consists of a vacuum pump which draws air through a test head. The specimen is placed on top of the test head opening by pressing down the clamping arm which automatically starts the vacuum pump. The measuring range is chosen so that the range display settles down in the green or yellow range.

The measurement is ended by pressing down the clamping arm a second time.

Measurement Parameters:

| Measurement area | 20 cm$^2$ |
|---|---|
| Test pressure | 100 Pa |
| Unit of measurement | l/m$^2$/s |
| Measuring range | 4-5 fabrics |
|  | 1 films, coatings |
| Test specimens | the one-sidedly coated fabrics are clamped in place with the coated side facing down. |

Water retention capacity in accordance with DIN 53814

Water retention capacity $W_r$ is the ratio of the weight m, of the amount of water taken up by the fiber to the weight $m_{tr}$ of the fiber dried at 105° C.

$$W_t \frac{m_W}{m_{tr}} = \frac{m_f - m_{tr}}{m_{tr}} \quad \begin{array}{l} m_W = \text{weight of conditioned fiber} \\ m_f = \text{weight of moist fiber} \\ m_{tr} = \text{weight of dried fiber} \end{array}$$

Determination of $W_t$

Four samples are weighed separately into a dry weighed centrifugal bottle with stopper (about 100 mg).

After weighing, the centrifugal bottles are placed on a rack and filled with the water (20±2 ml) from below.

Care must be taken to ensure that the entire sample remains immersed in water during the wetting operation. Wetting time should be 2 hours.

After wetting has ended, the centrifugal bottles are sealed with the stopper and placed into the holders for centrifuging.

They are centrifuged at 4000 m/min for 20 min.

After centrifuging, the bottles are weighed. Determination of moist weight $m_f$. After weighing, the samples are dried at (105±2)° C. to constant weight. For which the stoppers are taken off the centrifugal bottles. After cooling in a desiccator, the stoppers are put back on and the weight $m_{tr}$ of the dried sample is determined.

Calculation:

$$W_t = \frac{m_f - m_{tr}}{m_{tr}} * 100$$

Foams are typically differentiated according to their cell size, BET surface area and the number of cells in one unit volume. Industrial foams have a cell size in the range from 100 to 500 μm combined with a BET surface area in the range from 0.1 to 1 $m^2/g$ and about $10^5$ cells/$cm^3$. Crosslinked polyolefin foams have cell sizes of 20 to 100 μm, a BET surface area of about 10 $m^2/g$ combined with about $10^6$ cells/$cm^3$. Microcellular foams have a cell size of 1 to 10 μm combined with a BET surface area ranging from 10 to 20 $m^2/g$ and a cell number of $10^7$ to $10^9$ $cm^3$. Ultramicrocellular foams have a cell size of about 0.1 μm, a BET surface area ranging from 100 to 400 $m^2/g$ and about $10^9$ to $10^{12}$ cells/$cm^3$. A more exact definition of the various types of foam is to be found in J. L. Throne, Thermoplastic foams, Sharewood Publishers, Hinckley Ohio, 1996, chapter 11 "Newer foaming technologies".

Preparation of Moulded Parts 330 g polyamide are dissolved in 2210 g EMIM acetate in two batches at a temperature of 130° C. under stirring. A 13% by weight polymer solution is obtained.

Approximately 2400 g of the PA/EMIM-solution are transferred to aluminum trays at 130° C. and are cooled down over night in closed PE-containers. After the cooling the material was homogenous and wax-like. The material was cut into cubes of dimensions of approximately 1×1×1 cm. These cubes were introduced in a mesh container which was placed in a 3-liter-extraction container. The extraction container was a 3-liter-HWS-container with heating mantle, exit at the bottom and intensive-RF-cooler. A thermostat heated by oil was used for adjusting the temperature.

The extraction container was connected to an evaporator. The evaporator consisted of one 6-liter-round-bottomed flask which was connected with a stirrer motor, glass stirrer, heating equipment with controller, a glass pipe as connection to the extraction flask and a reflux line from the extraction flask to the evaporator via a 10 mm siphon-glass pipe.

The extraction container was filled with 1.5 l distilled water and further 2.5 l distilled water placed in the evaporator flask. The heating of the evaporator was adjusted to 105° C.

After two hours of continuous extraction, 4 l of the extract solution were replaced by fresh water. The exchange extract solution contained 1.34 kg EMIM Acetate. After seven hours of extracting, again 4 l of the extract solution were replaced by fresh water, and after 22 hours the extraction was completed.

The moulded parts taken from the mesh container had a slightly yellow color (corresponding to the colour of the polyamide). They were introduced into acetone and slurried with an ultraturrax, then filtered over a filter, mechanically broken up and dried at room temperature over night. Subsequently, drying was performed for six hours at 105° C. under reduced pressure. The yield after six hours was 316.2 g.

We claim:

1. A process for producing porous structures selected from porous fibers, foils, films, coatings or moldings, from polyamide comprising:
   dissolving the polyamide in an ionic liquid and
   precipitating or coagulating the dissolved polyamide by contacting the solution with a liquid precipitant medium, wherein the polyamide is polyhexamethylene adipamide, polyhexamethylene sebacamide, or polycaprolactam,
   wherein fibers are produced from the dissolved polyamide in a wet-spinning process by precipitation in protic solvents, and subsequent freeze-drying, foils, films or coatings are produced by blade coating the dissolved polyamide onto a substrate surface, dipping into a precipitation or coagulation bath, subsequent freeze-drying of the resulting foil, of the film or of the coated substrate and moulded parts are prepared by extracting the dissolved polyamide with protic solvents, wherein the dissolved polymer is transformed to a solid or wax-like state by cooling and extracted after subsequent moulding.

2. The process according to claim 1 wherein the cation in the ionic liquid is selected from substituted or unsubstituted imidazolium cations, substituted or unsubstituted 1,8-diazabicyclo[5.4.0]undec-7-enium cations or mixtures thereof.

3. The process according to claim 2 wherein the cation in the ionic liquid is selected from ethylmethylimidazolium (EMIM) cations, butylmethylimidazolium (BMIM) cations, 1,8-diazabicyclo[5.4.0]undec-7-enium (DBU) cations, 8-butyl-DBU cations, 8-octyl-DBU cations or mixtures thereof.

4. The process according to claim 2, wherein the anion in the ionic liquid is selected from halide, substituted or unsubstituted $C_{1-4}$-carboxylate, phosphate, $C_{1-4}$-alkyl phosphate, di-$C_{1-4}$-alkyl phosphate, $C_{1-4}$-alkyl sulfonate, hydrogensulfate or mixtures thereof.

5. The process according to claim 1, wherein the ionic liquid is ethylmethylimidazolium diethylphosphate (EMIM DEP), methylmethylimidazolium dimethylphosphate (MMIM DMP) or a mixture thereof or ethyleneethylimidazolium acetate (EMIM Acetate).

6. The process according to claim 1, wherein in the preparation of moulded parts the extraction is performed at a temperature which corresponds to the boiling point of the protic solvent ±10° C.

7. The process according to claim 1, wherein the protic solvents comprise water.

8. The process according to claim 7 further comprising spraying with the protic solvent a $C_{1-4}$-alcohol, or mixtures thereof, after blade coating the dissolved polyamide into the substrate surface and before dipping into the precipitation or coagulation bath.

9. The process according to claim 1, wherein the wet-spinning process is at a temperature of from 90 to 150° C.

10. The process according to claim 1, wherein the porous structure has a water retention in the range of from 210 to 264%.

11. The process according to claim 1, wherein the porous structure is a polyamide-based porous structure.

12. The process according to claim 1, wherein the porous structure consists essentially of polyamide.

* * * * *